(12) United States Patent
Johnson

(10) Patent No.: US 6,330,038 B1
(45) Date of Patent: *Dec. 11, 2001

(54) VIDEO SHARPNESS CONTROL DEVICE AND METHOD

(75) Inventor: Drew S. Johnson, Houston, TX (US)

(73) Assignee: Compaq Computer Corporation, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/829,607

(22) Filed: Mar. 31, 1997

(51) Int. Cl.⁷ .................................................. H04N 5/21
(52) U.S. Cl. ......................... 348/625; 348/628; 348/687; 348/622; 348/627
(58) Field of Search ........................... 348/625, 627, 348/628, 629, 686, 687, 554, 622; 382/266, 267, 268, 269, 263, 255–259; 358/532, 521, 455, 456, 458; H04N 5/21

(56) References Cited

U.S. PATENT DOCUMENTS

| | | | | |
|---|---|---|---|---|
| 4,656,665 | * | 4/1987 | Pennebaker | 382/172 |
| 4,682,251 | * | 7/1987 | Hirota | 386/114 |
| 4,935,807 | * | 6/1990 | Sendelweck | 348/554 |
| 4,945,351 | * | 7/1990 | Naiman | 348/471 |
| 4,963,958 | * | 10/1990 | Sendelweck | 348/554 |
| 4,963,979 | * | 10/1990 | Sendelweck | 348/554 |
| 5,043,802 | * | 8/1991 | Tarumizu et al. | 348/623 |
| 5,321,525 | * | 6/1994 | Hains | 358/456 |
| 5,784,126 | * | 7/1998 | Boccaccio | 348/708 |

* cited by examiner

Primary Examiner—Reinhard J. Eisenzopf
Assistant Examiner—Linus H. Lo
(74) Attorney, Agent, or Firm—Akin, Gump, Strauss, Hauer & Feld, LLP

(57) ABSTRACT

A method and device for enhancing the sharpness of a video image. The luminance signal portion of a television signal is boosted in its upper frequency range, e.g., between about 2.0 MHz and about 4.25 MHz. This enhancement of the luminance signal accentuates the transitions between the high brightness levels and low brightness levels of the luminance signal. The resulting video image appears much sharper because this quicker transition reduces the amount of signal carrying intermediate brightness information.

35 Claims, 8 Drawing Sheets

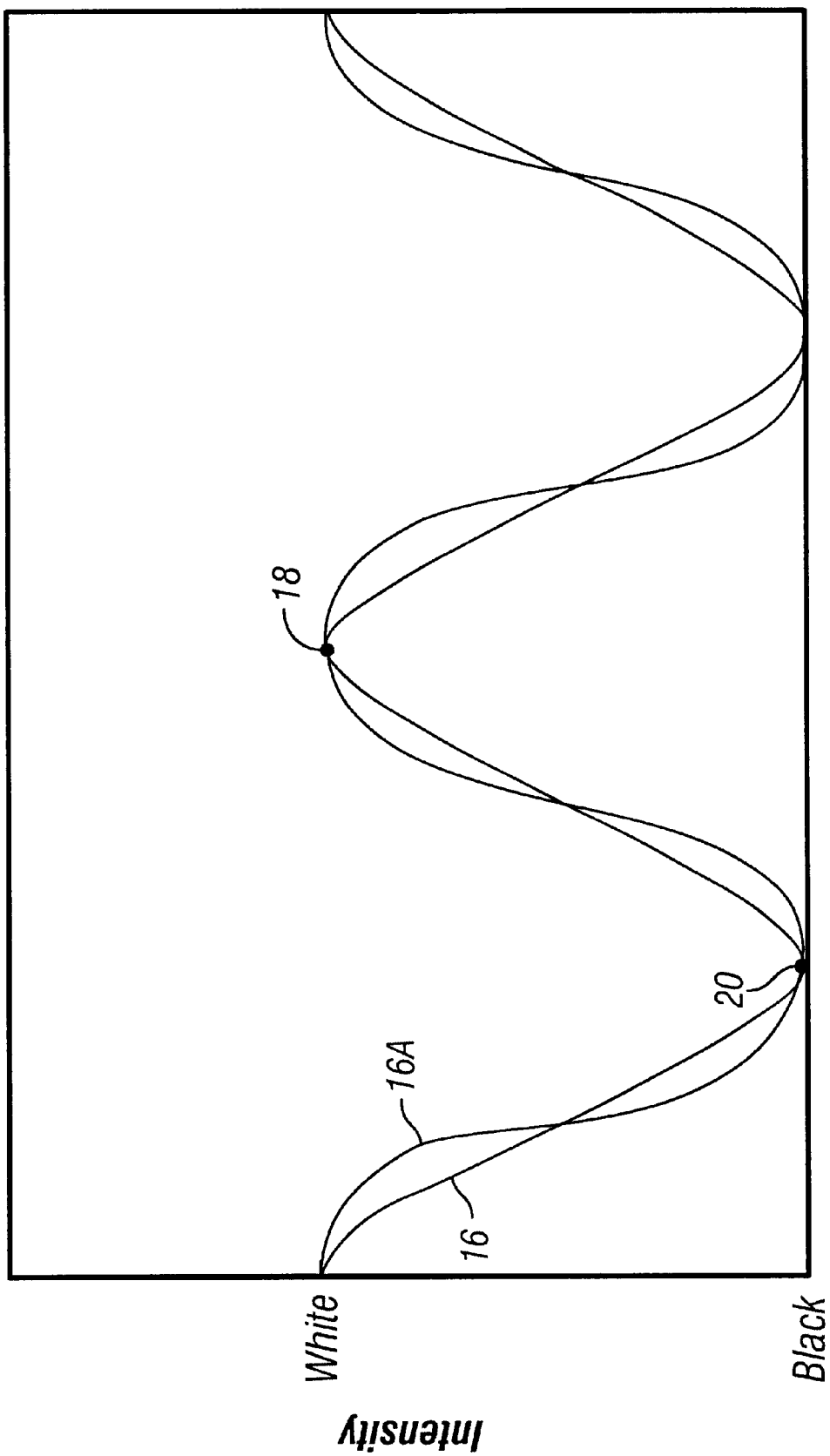

VIDEO SHARPNESS CONTROL DEVICE AND METHOD

BACKGROUND OF THE INVENTION

1. Field of the Invention

The present invention relates generally to video technology and, more particularly, to the enhancement of a video image.

2. Description of the Related Art

For most people in the United States, television is a normal part of their everyday lives. Television entertains, relaxes, and informs. In fact, using satellite communication, televisions have been generally credited with bringing the world closer together in the last twenty to thirty years.

It is, therefore, somewhat ironic that television technology arose out of the development of RADAR during World War II, from which evolved the high frequency circuits necessary for the introduction of television in 1945. Television became instantly popular, and technological advances over the past fifty years have enhanced its popularity. The improvements seem to be never ending. Just a few of the more significant improvements include: color picture, electronic tuners, coaxial cable signal transmission, the replacement of vacuum tube circuits with solid state circuits, and, of course, infrared remote controls.

Although the technologic advancement of the past fifty years has greatly improved television in almost every way imaginable, from picture quality to reliability, the television that we watch today still uses the standard developed by the National Television Systems Committee (NTSC) in the late 1940s. The incorporation of color in the NTSC standard approximately forty years ago marked its last major advancement. The NTSC's standardization activities were subsequently emulated throughout the world, leading to the development of other standards such as PAL and SECAM. Although new standards have been proposed from time to time in an effort to promote further forward leaps in technology for the improvement of television, the United States government and most foreign governments have been somewhat reluctant to stray from these long standing standards. The primary reason for this reluctance appears to be the governments' desire to protect the investments consumers have made in their television equipment. In other words, any new standard must be compatible with television equipment that consumers may have purchased many years before.

By way of example, let us consider the circumstances surrounding the evolution of television from its monochromatic (black and white) roots to the color video images that we are all familiar with today. For more than a decade after its introduction, television images were monochromatic. In other words, the video signal conveyed information relating primarily to brightness variations, much as does a black and white photograph. This monochromatic video signal is typically referred to as a luminance signal. However, to describe a color, the video signal needed to contain additional information. The government determined that any color system must produce a signal that is recognizable to a monochrome receiver as well as a color receiver, so that the viewer has a choice between a black and white television set or a color television set. Therefore, to incorporate the color information in the transmission signal, the NTSC determined that the luminance signal would remain unchanged and that the color signal would be added to the luminance signal. This color signal is typically referred to as the chrominance (or chroma) signal.

In color television sets, the analog luminance and chrominance signals are converted to a red-green-blue (RGB) format and used to drive the RGB electron guns that, in turn, excite the phosphors on the picture tube to produce the desired color video images. As most viewers know, various characteristics of a color video image may be adjusted to suit a viewer's taste. Such characteristics include brightness, contrast, color strength, tint, and sharpness. While each of these characteristics is important for the viewer's enjoyment of the television, the sharpness characteristic has become particularly important in this new era of digital television, multimedia, and PC TV. This newfound importance results from the increased use of graphics in the video images displayed by television monitors. These graphics may be superimposed on a typical broadcast video image, or the graphics may be displayed by the television monitor when used as a computer monitor.

The present invention is directed to overcoming, or at least reducing the affects of, one or more problems set forth above.

SUMMARY OF THE INVENTION

In accordance with one aspect of the present invention, there is provided a method of improving sharpness of a video image. The method includes the steps of: (a) receiving a luminance signal; (b) filtering the luminance signal to generate a filtered luminance signal that has frequency components at least nine decibels higher than the luminance signal from about 2.0 MHz to about 4.25 MHz; and (c) creating a video image correlative to the filtered luminance signal.

In accordance with another aspect of the present invention, there is provided a method of improving sharpness of a video image. The method includes the steps of: (a) receiving a luminance signal; (b) boosting frequency components of the luminance signal by at least nine decibels from about 3.0 MHz to about 4.0 MHz to generate a boosted luminance signal; and (c) using the boosted luminance signal to generate a video image.

In accordance with still another aspect of the present invention, there is provided a method of enhancing a video image. The method includes the steps of: (a) receiving a luminance signal that has a black signal portion, a white signal portion, and a transitional signal portion between the black signal portion and the white signal portion, the transitional signal portion having a dark gray signal portion and a light gray signal portion; (b) converting at least 50 percent of the light gray signal portion to the white signal portion to produce a converted luminance signal; and (c) creating a video image using the converted luminance signal.

In accordance with yet another aspect of the present invention, there is provided a video image. The video image includes a luminance signal having frequency components, the frequency components having a gain of at least nine decibels between about 3.0 MHz and about 4.0 MHz.

In accordance with a further aspect of the present invention, there is provided a digital television system. The system includes a video processor that is arranged to receive a luminance signal. The video processor includes a prefilter, a band pass filter, and a weighting stage. The prefilter receives the luminance signal and filters the luminance signal to generate a prefiltered luminance signal. The band pass filter receives the prefiltered luminance signal and filters the prefiltered luminance signal to generate a filtered luminance signal. The weighting stage receives the filtered luminance signal and weights the filtered luminance signal to produced a weighted luminance signal. A graphics controller receives the weighted luminance signal and creates a video image signal correlative to the weighted luminance signal. A monitor receives the video image signal and displays a video image correlative thereto.

In accordance with an even further aspect of the present invention, there is provided a device for improving sharpness of a video image. The device includes means for receiving a luminance signal. The device also includes means for boosting frequency components of the luminance signal by at least nine decibels from about 2.0 MHz to about 4.25 MHz to generate a boosted luminance signal. The device further includes means for generating a video image using the boosted luminance signal.

In accordance with a still further aspect of the present invention, there is provided a device for enhancing a video image. The device includes means for receiving a luminance signal that has a black signal portion, a white signal portion, and a transitional signal portion between the black signal portion and the white signal portion. The transitional signal portion has a dark gray signal portion and a light gray signal portion. The device also includes means for converting at least 50 percent of the light gray signal portion to the white signal portion to produce a converted luminance signal. The device further includes means for creating a video image using the converted luminance signal.

In accordance with a yet further aspect of the present invention, there is provided a system that includes a video processor for receiving a luminance signal and boosting frequency components of said luminance signal by at least nine decibels from about 2.0 megahertz to about 4.25 megahertz to generate a boosted luminance signal. The system also includes a graphics controller for generating a video image correlative to said boosted luminance signal.

In accordance with another aspect of the present invention, there is provided a device for enhancing a video image. The device includes a video processor that receives a luminance signal that has a black signal portion, a white signal portion, and a transitional signal portion. The video processor converts at least 50 percent of the transitional signal portion to the white signal portion to produce a converted luminance signal. The device also includes a graphics system that creates a video image using the converted luminance signal.

BRIEF DESCRIPTION OF THE DRAWINGS

The foregoing and other advantages of the invention may become more apparent upon reading the following detailed description and upon reference to the drawings in which:

FIG. 1C illustrates exemplary analog luminance signals corresponding to the video images of FIGS. 1A and 1B;

FIG. 9 illustrates a second plot of luminance signal gain produced by the luminance circuit of FIG. 6 with the prefilter on.

DETAILED DESCRIPTION OF SPECIFIC EMBODIMENTS

As described below, to enhance the resolution of a video signal so that graphical information in the video image appears sharper and clearer, the video signal is processed to improve the sharpness characteristic. Specifically, as mentioned previously, the video signal is comprised of a luminance signal and a chrominance signal. To improve the sharpness of the video signal, the luminance signal is separated from the chrominance signal, and a certain frequency range of the luminance signal is boosted to accentuate transitions between the black and white portions of the signal.

Figure 1A:
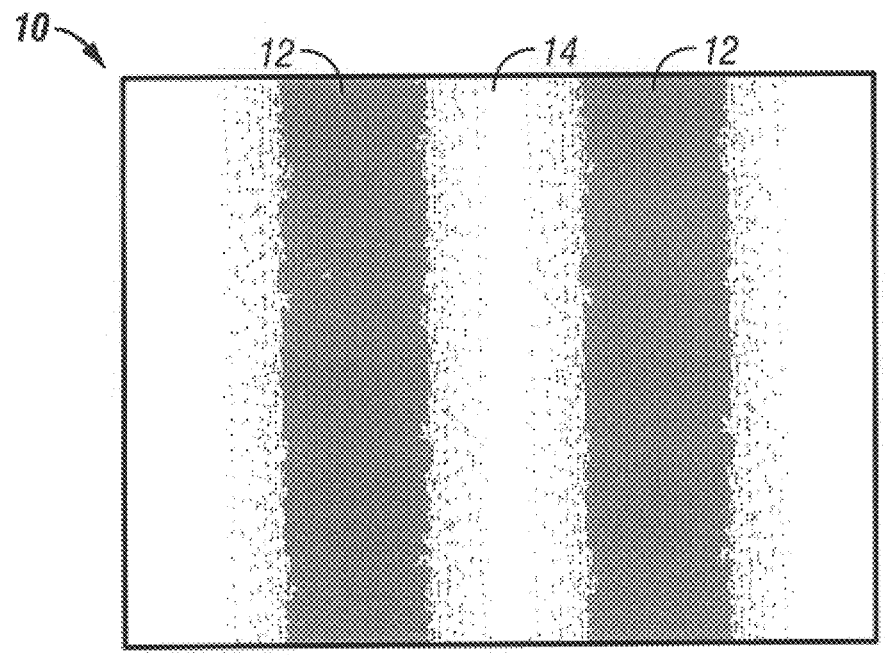
FIG. 1A illustrates a video image of a pattern of alternating black and white bars having a low sharpness level.

Turning now to the drawings, and referring initially to FIG. 1A, a video image 10 is illustrated. The video image 10 includes a plurality of alternating black bars 12 and white bars 14. Although the discussion above referred to graphical information as being in need of enhanced resolution, the video image 10 having the plurality of alternating black bars 12 and white bars 14 has been chosen in this example to simplify the following discussion. However, it is understood that graphical information is generally presented against a background where there is a relatively large difference between the brightness characteristics of the graphical information and the brightness characteristics of the background. In other words, it is common for dark letters to be presented on a light screen—much like the black bars 12 contrast with the white bars 14.

The analog luminance signal that corresponds to a horizontal line of the video image 10 is illustrated by the curve 16 in FIG. 1C. As can be seen by the curve 16, each intensity peak 18 of the luminance signal corresponds to a high brightness level, i.e., white, and the intensity valleys 20 of the luminance signal correspond to low brightness levels, i.e., black. The portion of the luminance signal 16 between each peak 18 and each valley 20 correspond to intermediate brightness levels that may be thought of as different shades of gray, with dark gray portions being closer to the valleys 20 and light gray portions being closer to the peaks 18. In other words, very little of the luminance signal 16 carries brightness level information correlative to a completely white or a completely black video image. Rather, a significant portion of the luminance signal 16 carries brightness information correlative to a video image having varying shades of gray.

If we think of the white bars 14 of the video image 10 as a background and the black bars 12 of the video image 10 as graphical information, such as a letter, number, or icon, it is easy to see that the luminance signal 16 produces "fuzzy" graphical information. In other words, the black bars 12 are not truly black, and the white bars 14 are not truly white. Rather, the black bars 12 are comprised primarily of a dark gray image, and the white bars 14 are comprised primarily of a light gray image, as illustrated in FIG. 1A.

Figure 1B:
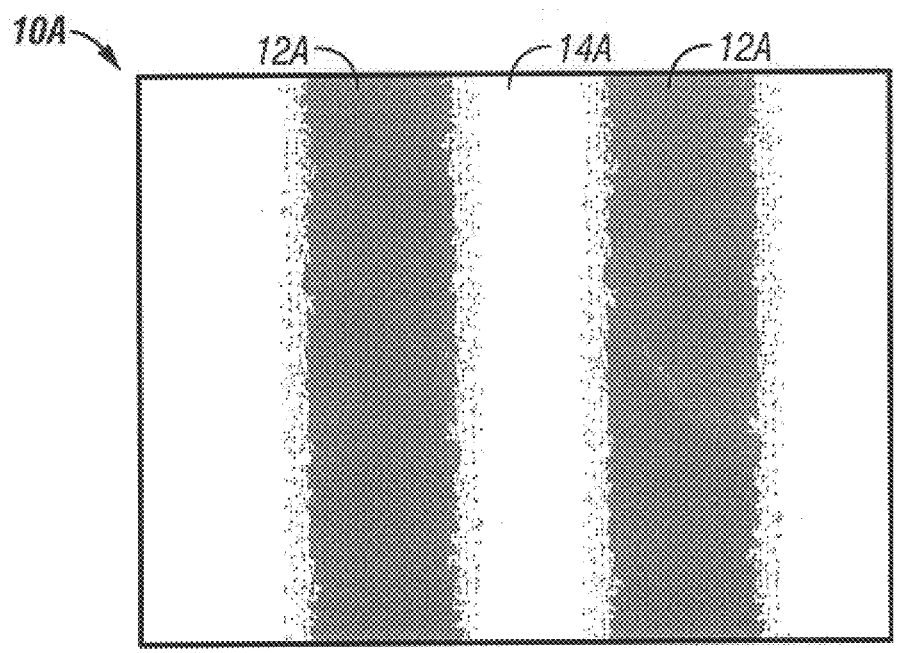
FIG. 1B illustrates a video image of a pattern of alternating black and white bars having a high sharpness level.

To increase the sharpness of the video image 10, the device and method discussed below increase the rate at which the luminance signal 16 transitions from a high intensity level 18 to a low intensity level 20 and vice versa. The luminance signal 16A illustrated in FIG. 1C is one example of how the luminance signal 16 may be altered to achieve this result. Notice that the transitional portion of the luminance signal 16A is much steeper or sharper than the transitional portion of the luminance signal 16. The altered luminance signal 16A produces a video image 10A illustrated in FIG. 1B. As can be seen, the black bars 12A and the white bars 14A in the video image 12A are much sharper and distinct as compared with the black bars 12 and the white bars 14 in the unaltered video image 10. This difference is due to the sharper transitions between contrasting brightness levels.

Figure 2:
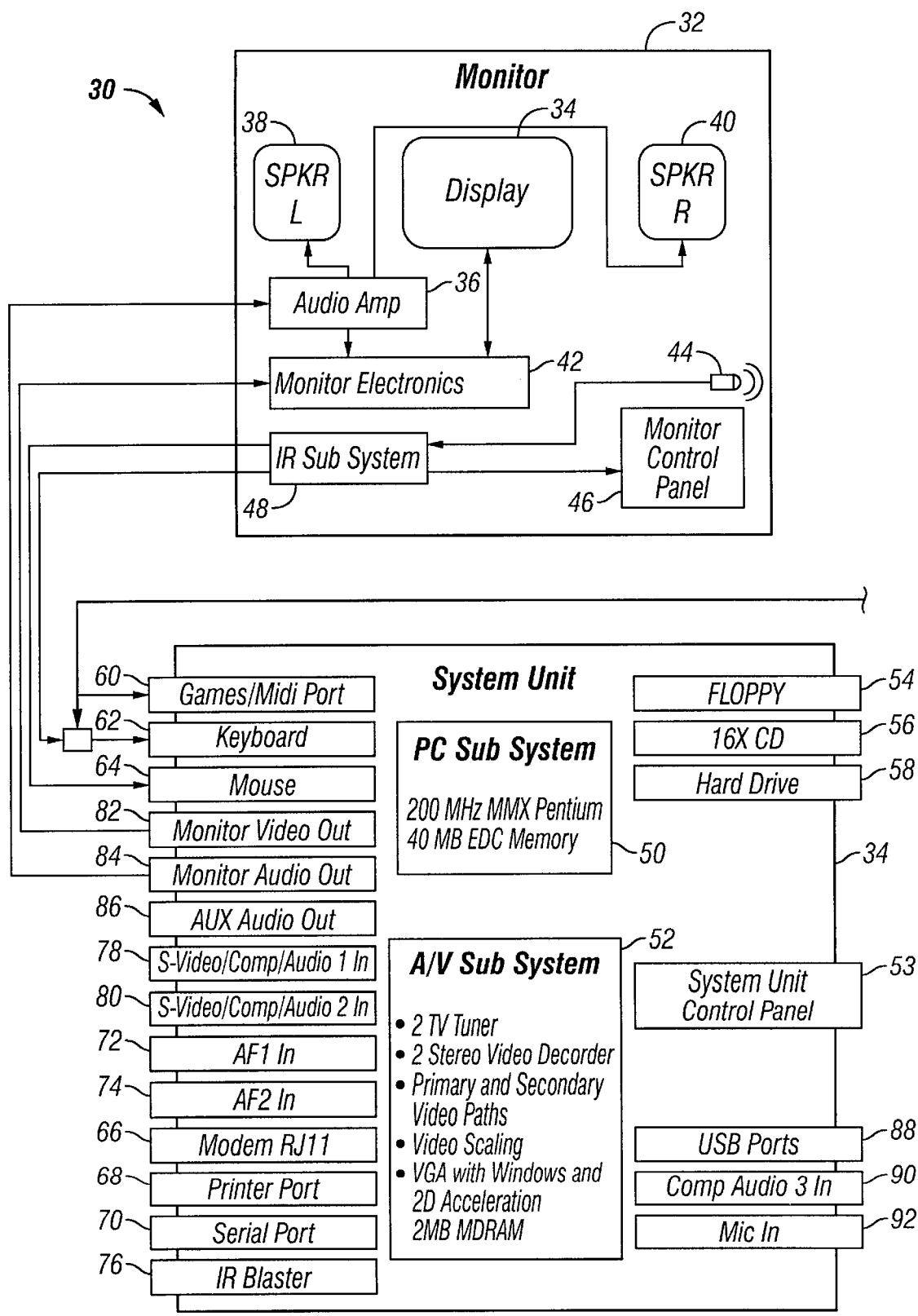
FIG. 2 illustrates a block diagram of a PC TV system having, among other things, a television monitor, a PC subsystem, and an audio/video subsystem.

One system that may incorporate and benefit from such a sharpness control device and method is illustrated in FIG. 2 as a PC TV system 30. As will be appreciated after studying the following discussion, the video image 10 produced by the PC TV system 30 may be completely composed of the broadcast television signal, completely composed of the PC subsystem signal, or composed of a mixture of the two. For instance, if the viewer uses the PC TV system 30 in its television mode, the video image 10 is composed of solely the broadcast television signal. At the other end of the spectrum, if the viewer uses the PC TV system 30 in its PC mode, the video image 10 is composed solely of video images generated by the PC subsystem 50. However, the viewer may create a video window in a video image 10 that is primarily composed of graphical information from the PC subsystem 50. Alternatively, the viewer may create a graphics window in a video image 10 that is primarily composed of the broadcast video signal.

The PC TV system 30 includes a monitor 32 that is coupled to a system unit 35. The monitor 32 includes a display 34 which may be a cathode ray tube having a pixel array of 720 pixels by 480 pixels, for example. The monitor 32 may also include an audio amplifier 36 that drives left and right speakers 38 and 40. Monitor electronics 42 are coupled to the display 34 and to the audio amplifier 36 to facilitate the delivery and control of the video and audio signals output by the monitor 32. A viewer may input control signals to the PC TV system 30 using a control panel 46 or using a remote control (not shown) which communicates with the infrared subsystem 48 via an infrared sensor 44. An example of a monitor 32 that may be used with this embodiment is described in greater detail FIG. 1 of in U.S. patent application Ser. No. 08/843,185 filed Feb. 19, 1997, entitled Computer System Designed For Distance Viewing Of Information And Media And Extensions To Display Data Channel For Control Panel Interface. which is incorporated by reference.

The system unit 35 provides audio, video, and graphical information to the monitor 32. The system unit 35 includes a personal computer (PC) subsystem 50 and an audio/video subsystem 52. The PC subsystem 50 may be any suitable computer system. However, in this embodiment, the PC subsystem 50 includes an Intel MMX Pentium microprocessor (not shown) running at 200 MHz. The processor is coupled to a memory/PCI/cache controller (not shown), such as an Intel 82437. The controller is coupled to a suitable system memory (not shown), which includes 40 Megabytes of EDO memory in this embodiment. The PC subsystem 50 may also include other features typically found on personal computer systems, such as a control panel 53, a floppy drive 54, a CD drive 56, a hard drive 58, a games port 60, a keyboard 62, a mouse 64, a modem port 66, a printer port 68, and a serial port 70.

The audio/video subsystem 52, in this embodiment, includes two television tuners, two stereo video decoders, primary and secondary video paths, video scaling, VGA with windows and 2D acceleration, and two megabytes of MDRAM. Accordingly, the audio/video subsystem 52 includes two RF input channels 72 and 74, an IR blaster 76, two S-video/comp/audio input channels 78 and 80, a video output channel 82 to the monitor 32, an audio output channel 84 to the monitor 32, and an auxiliary audio output channel 86. The audio/video subsystem 52 may also include other features typically associated with an audio/video system, such as USB ports 88, audio input channels 90, and microphone input channels 92.

Figure 3:
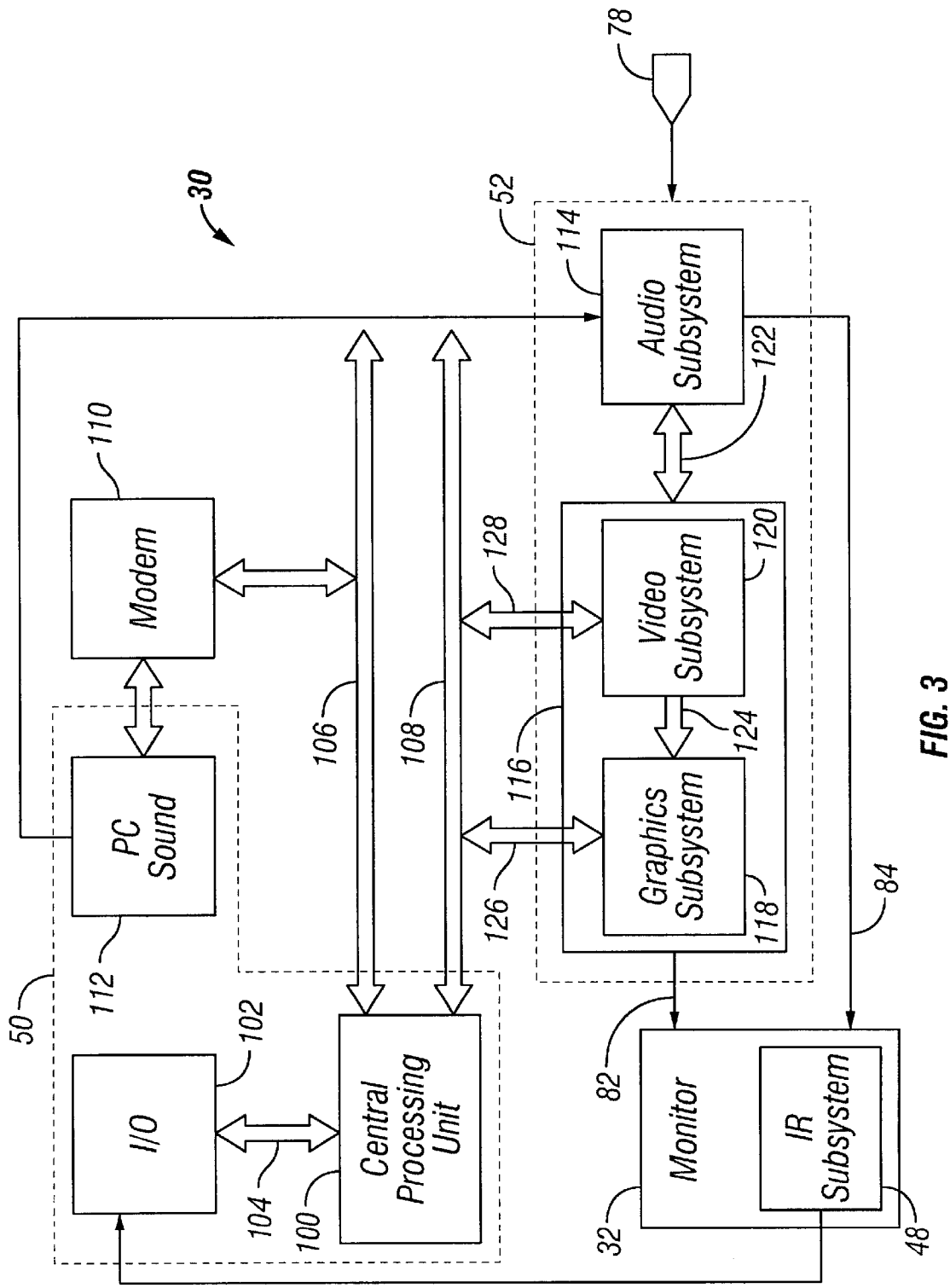
FIG. 3 illustrates a block diagram of a portion of the system unit illustrated in FIG. 2.

The operation of the PC TV system 30 may be better understood by referring to the block diagram illustrated in FIG. 3. The PC subsystem 50 functions much like a normal personal computer. The central processing unit 100 includes the processor, memory controller, and system memory mentioned previously. The central processing unit 100 communicates with an input/output device 102, such as an SMC 34C931 Ultra I/O, via a bus 104. The input/output device 102 may interface with a number of devices such as the keyboard 62, the mouse 64, the floppy drive 54, the serial port 70, and the system ROM. The central processing unit 100 communicates with other portions of the PC TV system 30 via an ISA bus 106 and a PCI bus 108. For instance, the central processing unit 100 may communicate with a modem 110 using the ISA bus 106. The PC subsystem may also include a PC sound card 112.

Broadcast television signals are received by the S-video/comp/audio inputs 78 and 80. However, for ease of discussion, only one channel will be described herein. Therefore, only port 78 is illustrated in FIG. 3. Port 78 delivers the television signal to the audio/video subsystem 52. The audio/video subsystem 52 breaks the composite television signal into its component parts for further processing. For instance, the audio system 114 processes the audio portion of the incoming television signal while a graphics/video system 116, which includes a graphics subsystem 118 and a video subsystem 120, processes the video portion of the incoming television signal. The audio system 114 communicates with the graphics/video system 116 via a bidirectional bus 122. The video subsystem 120 communicates with the graphic subsystem 118 via a unidirectional bus 124. Once the audio/video subsystem 52 has finished processing the television signal, the video portion of the signal is delivered by the graphics/video system 116 via the video output 82 to the monitor 32. Similarly, the audio portion of the processed television signal is delivered by the audio system 114 via the audio output 84 to the monitor 32.

It should be understood that in a PC TV system, such as the illustrated system 30, the audio/video subsystem 52 may also process information received from the PC subsystem 50. In fact, if the user of the PC TV system 30 is using the system in its personal computer mode, all of the video image displayed by the monitor 32 may originate in the PC subsystem 50. Accordingly, the PC subsystem 50 communicates with the audio/video subsystem 52 via bidirectional buses 126 and 128. The bidirectional bus 126 couples the graphic subsystem 118 to the PCI bus 108, and the bidirectional bus 128 couples the video subsystem 120 to the PCI bus 108. In addition to video images, the PC subsystem 50 may also deliver audio signals to the monitor 32. Accordingly, the PC sound card 112 delivers audio signals to the audio system 114 via a line 130. The audio system 114 processes the audio signals on line 130 and delivers the processed audio signals to the monitor 32 via the audio output 84.

Figure 4:
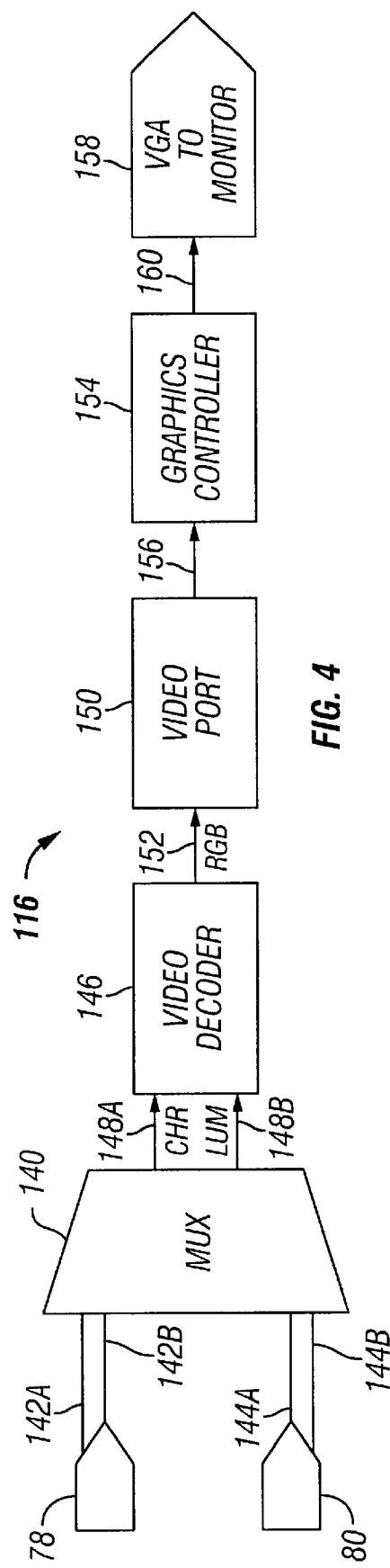
FIG. 4 illustrates a block diagram of a portion of the audio/video subsystem of FIG. 3.

A portion of the graphics/video subsystem 116 is illustrated in FIG. 4. The composite video signals from the ports 78 and 80 enter an analog multiplexer 140. Each video signal includes a chrominance signal CHR and a luminance signal LUM that are input to the analog multiplexer 140 on separate lines 142A, 142B and 144A, 144B, as illustrated in FIG. 4. The analog multiplexer 140 may also receive other signals that are not pertinent to this discussion. The chrominance signal CHR and the luminance signal LUM from one of the channels 78 and 80 is delivered to a video decoder 146. As mentioned previously, the PC TV system 30 includes two channels, one for the primary video source and one for the secondary video source. Therefore, it should be understood that in the actual embodiment, the chrominance signal CHR and the luminance signal LUMN from the other video port 80 are sent to another video decoder (not shown). In this embodiment, the video decoder is a Phillips SAA7111. As will be explained in greater detail below, although the video decoder 146 may receive both the chrominance signal CHR and the luminance signal LUM, it uses only the luminance signal LUM to improve the sharpness of the video image 10. Generally speaking, the video decoder 146 converts the analog chrominance and luminance signals into a digital format, processes the signals independently, and provides the signals in the YUV format to the graphics subsystem.

The video decoder 146 delivers the YUV signal to a video port 150 via a line 152. The video port may be a VPR6100 available from Tseng Labs. The video port 150, in turn, delivers the YUV signal to a graphics controller 154 via a line 156. The graphics controller 154 may include an ET6000 available from Tseng Labs, along with MDRAM. Although not illustrated in FIG. 4, the graphics controller 154 may also receive data from the PC subsystem 50 via the PCI bus 108 and the bidirectional bus 126. Generally speaking, the graphics controller 154 combines the broadcast video signals with signals received from the PC subsystem 50 to create the video image 10 which will be displayed on the monitor 32. The graphics controller 154 delivers the video image signal to a VGA board 158 via line 160, and the VGA board 158 delivers the video signal to the monitor 32.

Figure 5:
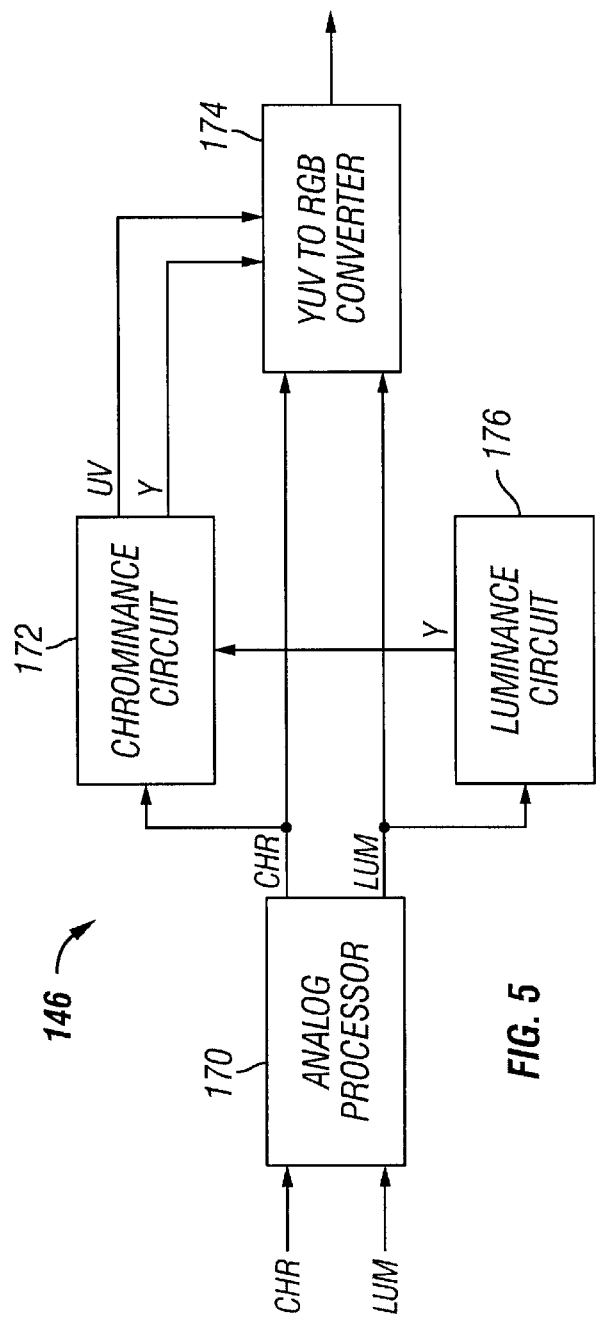
FIG. 5 illustrates a block diagram of the video decoder of FIG. 4.

Portions of the video decoder 146 are illustrated in FIG. 5. An analog processor 170 receives the luminance signal LUM and the chrominance signal CHR from the analog multiplexer 140. Among other things, the analog processor 170 converts the analog luminance signal LUM and chrominance signal CHR to a digital format. In regard to the luminance signal LUM, the lowest brightness level is generally designated by the lowest digital value, and the highest brightness level is generally designated by the highest digital value. For instance, in an eight bit system, the lowest brightness level (black) may be designated as 00H, and the highest brightness level (white) may be designated as FFH. Intermediate levels of brightness, such as those found in the transitional portions of the luminance signals 16 and 16A of FIG. 1C, may be designated using intermediate digital values. For instance, dark gray portions may be designated between 01H and 8FH, and light gray portions may be designated between A0H and FEH.

Once the analog processor 170 digitizes the luminance and chrominance signals, the digital chrominance signal is delivered to a chrominance circuit 172, and the digital luminance signal is delivered to a luminance circuit 176. Generally speaking, the luminance circuit 176 enhances the luminance signal LUM, and delivers the enhanced luminance signal Y to the chrominance circuit 172. The chrominance circuit 176 enhances the chrominance signal CHR to produce an enhanced chrominance signal UV. The chrominance circuit 172 further enhances the luminance signal Y and the chrominance signal UV for adjustments to brightness, contrast, hue, and saturation information. The chrominance circuit 172 then delivers the YUV signal to the graphics subsystem that converts the YUV signal to the RGB signal that is used to create the video image 10 on the display 34.

Figure 6:
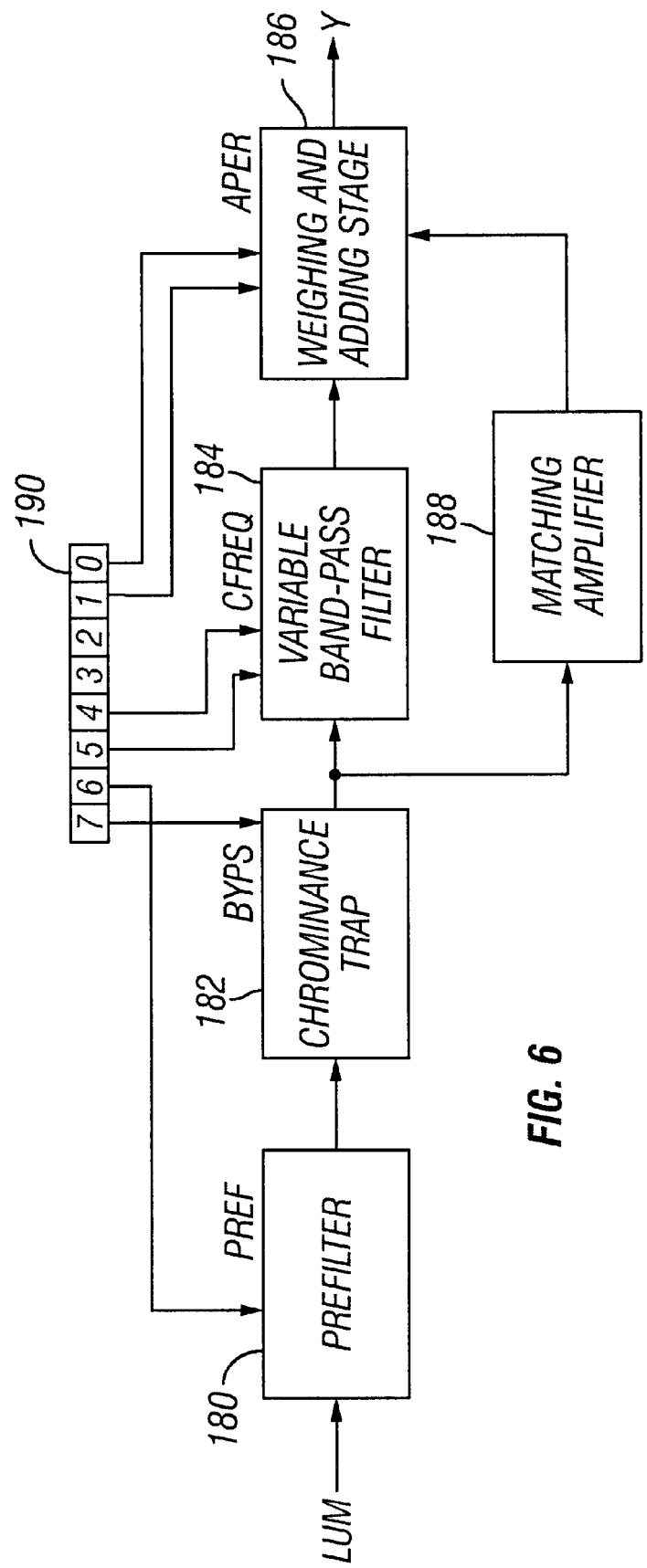
FIG. 6 illustrates a portion of the luminance circuit of FIG. 5.

As illustrated in FIG. 6, the luminance circuit 176 includes a prefilter 180, a chrominance trap 182, a variable band pass filter 184, a weighting and adding stage 186, and a matching amplifier 188, all of which are connected as illustrated. The luminance circuit 176 also includes a decoder register 190, which, in this embodiment, is an eight bit register that is used to control the luminance circuit 176. Specifically, the prefilter 180 includes an input PREF from the register 190 that is used to enable and disable the operation of the prefilter 180. Similarly, the chrominance trap 182 includes an input BYPS from the register 190 that is used to enable or disable the chrominance trap 182. The variable band-pass filter 184 includes center frequency inputs CFREQ from the register 190 that may be used to set the center frequency of the band pass filter 184 to one of four different settings. Finally, the weighting and adding stage 186 includes inputs APER from the register 190 that may be used to set the aperture factor of the weighting and adding stage 186 to one of four different settings.

As illustrated below in Table 1, the logic levels of the data bits for positions 0 through 7 of the register 190 may be set to cause the luminance circuit 176 to operate in a particular fashion.

TABLE I

| FUNCTION | APER/BPSS BITS | LOGIC LEVELS | DATA BITS |
|---|---|---|---|
| Aperture factor (APER) | | | |
| Aperture factor = 0 | APER1 | 0 | D1 |
|  | APER0 | 0 | D0 |
| Aperture factor = 0.25 | APER1 | 0 | D1 |
|  | APER0 | 1 | D0 |
| Aperture factor = 0.5 | APER1 | 1 | D1 |
|  | APER0 | 0 | D0 |
| Aperture factor = 1.0 | APER1 | 1 | D1 |
|  | APER0 | 1 | D0 |
| Update time interval for AGC value (UPTCV) | | | |
| Horizontal update (once per line) | — | 0 | D2 |
| Vertical update (once per line) | — | 1 | D2 |

TABLE I-continued

| FUNCTION | APER/BPSS BITS | LOGIC LEVELS | DATA BITS |
|---|---|---|---|
| Vertical blanking luminance bypass (VBLB) | | | |
| Active luminance processing | — | 0 | D3 |
| Luminance bypass during vertical blanking | — | 1 | D3 |
| Aperture band pass (centre freguency) (BPSS) D5 and D4 | | | |
| Centre frequency = 4.1 MHz | BPSS1 | 0 | D5 |
|  | BPSS0 | 0 | D4 |
| Centre frequency = 3.8 MHz; note 1 | BPSS1 | 0 | D5 |
|  | BPSS0 | 1 | D4 |
| Centre frequency = 2.6 MHz, note 1 | BPSS1 | 1 | D5 |
|  | BPSS0 | 0 | D4 |
| Centre frequency = 2.9 MHz, note 1 | BPSS1 | 1 | D5 |
|  | BPSS0 | 1 | D4 |
| Prefilter active (PREF) | | | |
| Bypassed | — | 0 | D6 |
| Active | — | 1 | D6 |
| Chrominance trap bypass (BYPS) | | | |
| Chrominance trap active; default for CVBS mode | — | 0 | D7 |
| Chrominance trap bypassed; default for S-Video mode | — | 1 | D7 |

Note 1: Not to be used with bypassed chrominance trap.

Figure 7A:
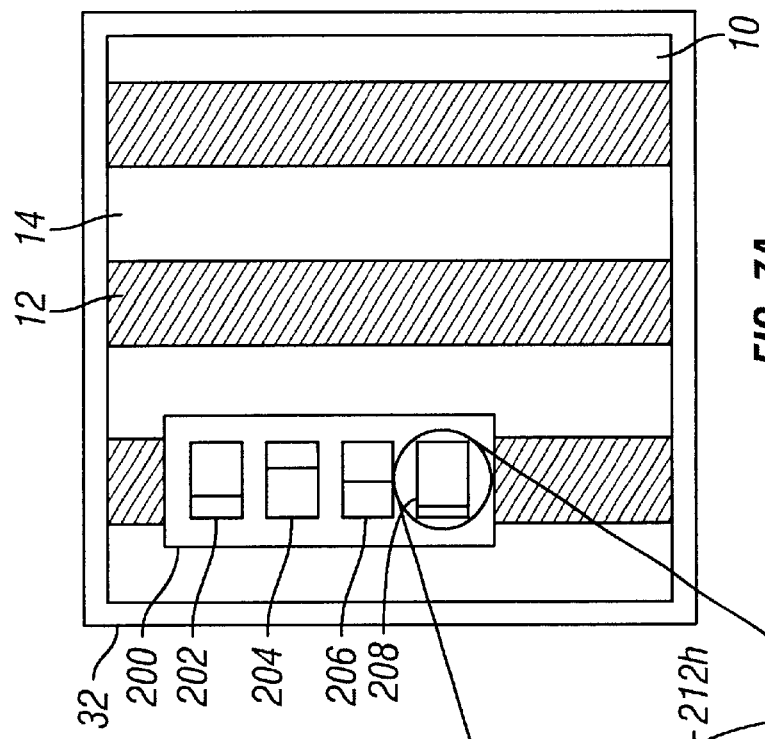
FIG. 7A illustrates a television monitor having a video image of a picture qualities applet.
Figure 7B:
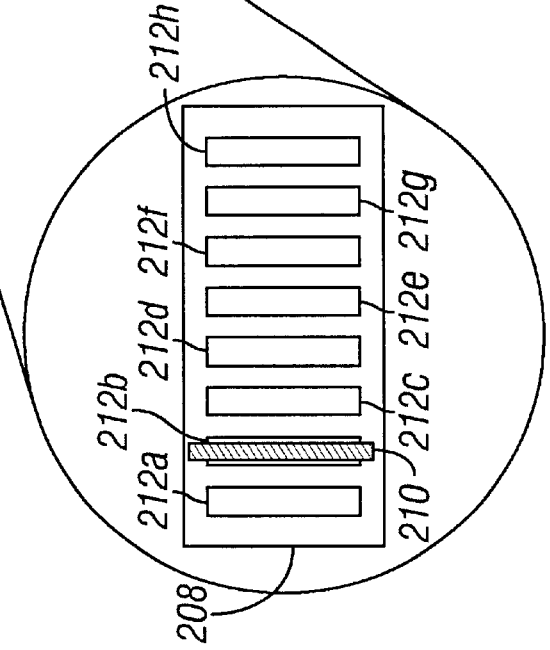
FIG. 7B illustrates a portion of the applet of FIG. 7A relating to viewer-controllable sharpness control.

The luminance circuit 176 may be used to enhance the luminance signal LUM to improve the sharpness of the video image 10. FIG. 7A illustrates an exemplary video image 10 that is composed primarily of the broadcast television signal (black and white bars 12 and 14 in this example) and a graphical user applet 200. Using a remote control or the control panel 46, a viewer may cause the applet 200 to appear on the video image 10 so that the viewer can adjust various characteristics of the video image 10. For instance, the applet 200 may include user adjustable "slide controls," such as a brightness control 202, a contrast control 204, a tint control 206, and a sharpness control 208. As illustrated in the enlarged view of FIG. 7B, the sharpness control 208 may include a "slide" 210 that may be placed at any one of eight different settings 212a, 212b, 212c, 212d, 212e, 212f, 212g, and 212h.

Throughout the processing of the luminance signal LUM, the chrominance trap 182 is bypassed, so the input BYPS (corresponding to position 7 of the register 190) is set to a logical 1.

Accordingly, the center frequency of the variable band pass filter 184 is set to 4.1 MHz. Therefore, the input CFREQ (corresponding to bits 4 and 5 in the register 190) is set to logic level 00. Also, throughout the processing of the luminance signal LUM, vertical blanking of the luminance signal is bypassed by setting bit 3 of the register 190 to a logical 1. Finally, the horizontal update is activated by setting bit number 2 of the register 190 to a logical 0.

Although the above-listed parameters do not change during the processing of the luminance signal LUM, the aperture settings of the weighting and adding stage 186 and the status of the prefilter 180 are changed depending upon the position of the slider 210. These changes are denoted below by reference to Table II where the lowest sharpness level is designated as level 0 (coresponding to position 212a) and the highest sharpness level is designated as level 7 (coresponding to position 212h).

TABLE II

| Sharpness Level | Register 190 Setting | Aperture Setting | Prefilter Status |
|---|---|---|---|
| 0 | 10001000 | 0 | off |
| 1 | 10001001 | 1 | off |
| 2 | 10001010 | 2 | off |
| 3 | 10001011 | 3 | off |
| 4 | 11001000 | 0 | on |
| 5 | 11001001 | 1 | on |
| 6 | 11001010 | 2 | on |
| 7 | 11001011 | 3 | on |

As can be seen, as the viewer positions the slider 210 consecutively through the first four positions 212a, 212b, 212c, and 212d, the prefilter 180 remains off, and the aperture setting in creases with each step. However, when the viewer begins stepping through the last four sharpness settings by positioning the slider 210 consecutively through positions 212e, 212f, 212g, and 212h, the prefilter 180 turns on, and the weighting and adding stage 186 again steps through the four aperture settings.

Figure 8:
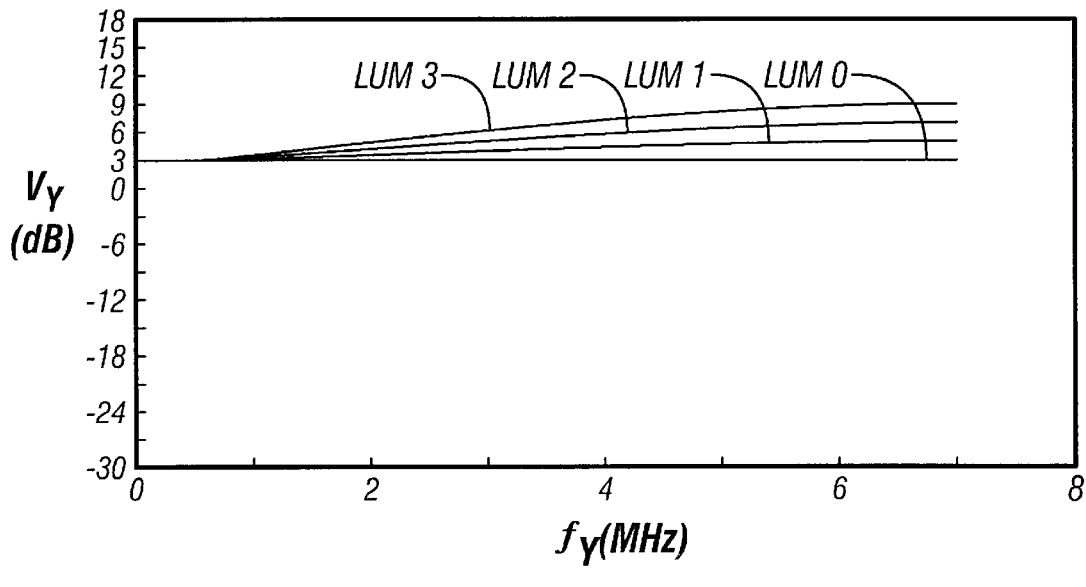
FIG. 8 illustrates a first plot of luminance signal gain produced by the luminance circuit of FIG. 6 with the prefilter off.

The effects of the first four sharpness settings on the luminance signal LUM are illustrated in FIG. 8. FIG. 8 plots the voltage gain of the luminance signal Y in decibels versus the frequency of the luminance signal in megahertz. Although the gain illustrated in FIGS. 8 and 9 extends about 7 megahertz, it should be understood that the luminance signal LUM may typically contain frequency components from about 0 hertz to at least about 4.25 megahertz, and possibly as high as about 5.0 megahertz. As can be seen, with the slider 210 in the first position 212a, the luminance signal YO experiences a steady+3 dB gain across its entire frequency range. As the slider 210 moves to the second position 212b, the third position 212c, and the fourth position 212d, the gain of the upper frequency components, particularly those above 2 MHz, increases as illustrated by the respective luminance signals Y1, Y2, and Y3.

Figure 9:
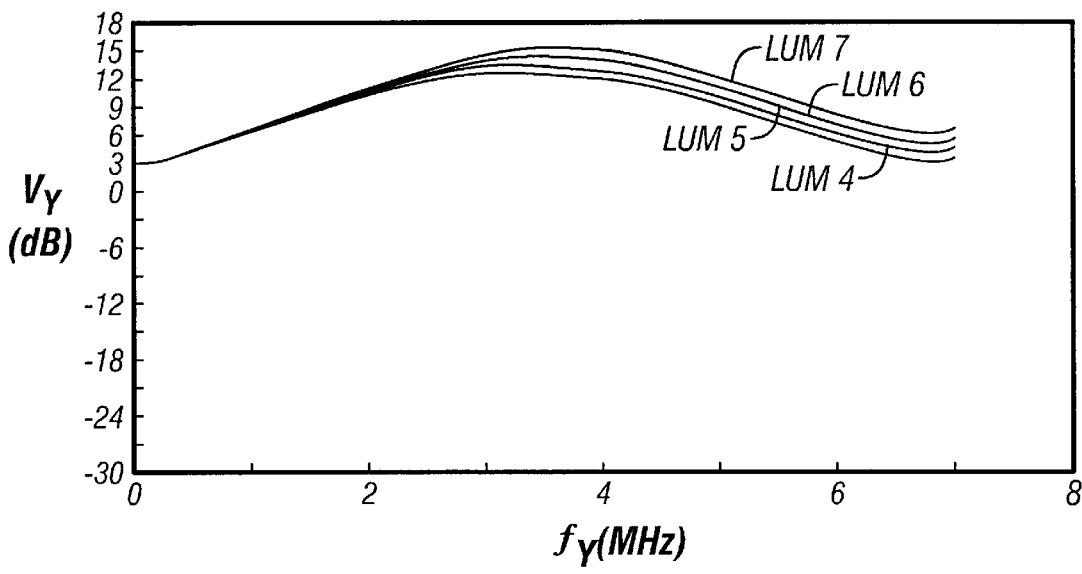

Once the prefilter 180 is turned on by positioning the slider 210 in one of the last four positions 212e, 212f, 212g, or 212h, a significant gain in the upper frequency components of the luminance signal are realized, as illustrated in FIG. 9. For instance, when the slider 210 is placed in position 212e, the aperture setting returns to its initial position and the prefilter 180 is turned on, as can be seen from Table II. The luminance signal Y4 experiences a significant gain beginning at about 0.25 MHz. The gain is over 9 decibels at about 1.75 MHz and over 12 decibels at about 3 MHz. As the aperture setting is incremented as the slider 210 is consecutively placed in the final three positions 212f, 212g, and 212h, the luminance signal experiences even greater gains, particularly in the frequencies above 2.5 MHz, as illustrated by the luminance signals Y5, Y6, and Y7, respectively. In the digital domain, a 6 dB gain corresponds to approximately 50% of the "gray" signal being converted to "white," a 9 dB gain corresponds to approximately 65% of the "gray" signal being converted to "white," a 12 dB gain corresponds to approximately 75% of the "gray" signal being converted to "white," and a 15 dB gain corresponds to approximately 80% of the "gray" signal being converted to "white."

Because the higher frequency components of the luminance signal Y are significantly boosted by turning on the prefilter 180, the luminance signal Y transitions quicker between high brightness levels and low brightness levels as compared with the incoming luminance signal LUM. Thus, the resulting video image 10 becomes sharper, as illustrated by the contrast between the video images 10 and 10A.

While the invention may be susceptible to various modifications and alternative forms, specific embodiments have been shown by way of example in the drawings and has been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method for improving sharpness of a video image, said method comprising the steps of:
    (a) receiving a luminance signal;
    (b) filtering said luminance signal to generate a filtered luminance signal, said filtered luminance signal having frequency components more than ten decibels higher than said luminance signal from about 2.5 megahertz to about 4.25 megahertz; and
    (c) creating a video image correlative to said filtered luminance signal.

2. The method, as set forth in claim 1, wherein step (a) comprises the step of:
    converting said luminance signal from an analog signal to a digital signal; and
    wherein the luminance signal filtered in step (b) is the digital signal.

3. The method, as set forth in claim 1, wherein step (b) comprises the steps of:
    prefiltering said luminance signal to generate a prefiltered luminance signal; and
    selectively weighting said prefiltered luminance signal to generate said filtered luminance signal.

4. The method, as set forth in claim 1, wherein step (c) comprises the steps of:
    combining said filtered luminance signal with a chrominance signal to produce a YUV signal; and
    converting said YUV signal to an RGB signal.

5. A method of improving sharpness of a video image, said method comprising the steps of:
    (a) receiving a luminance signal;
    (b) boosting frequency components of said luminance signal by more than ten decibels from about 3.0 megahertz to about 4.0 megahertz to generate a boosted luminance signal; and
    (c) using said boosted luminance signal to generate a video image.

6. The method, as set forth in claim 5, wherein step (a) comprises the step of:
    converting said luminance signal from an analog signal to a digital signal, and
    wherein the luminance signal filtered in step (b) is the digital signal.

7. The method, as set forth in claim 5, wherein step (b) comprises the step of:
    boosting frequency components of said luminance signal by at least twelve decibels from about 3.0 megahertz to about 4.0 megahertz to generate said boosted luminance signal.

8. The method, as set forth in claim 5, wherein step (b) comprises the steps of:
    prefiltering said luminance signal to generate a prefiltered luminance signal; and
    selectively weighting said prefiltered luminance signal to generate said boosted luminance signal.

9. The method, as set forth in claim 5, wherein step (c) comprises the steps of:
    combining said boosted luminance signal with a chrominance signal to produce a YUV signal; and
    converting said YUV signal to an RGB signal.

10. A method of enhancing a video image, said method comprising the steps of:
    (a) receiving a luminance signal, said luminance signal having a black signal portion, a white signal portion, and a transitional signal portion between said black signal portion and said white signal portion, said transitional signal portion having a dark gray signal portion and a light gray signal portion;
    (b) converting at least 50 percent of said light gray signal portion to said white signal portion to produce a converted luminance signal; and
    (c) creating a video image using said converted luminance signal.

11. The method, as set forth in claim 10, wherein step (a) comprises the step of:
    converting said luminance signal from an analog signal to a digital signal.

12. The method, as set forth in claim 10, wherein step (b) comprises the step of: boosting frequency components of said luminance signal by at least nine decibels from about 3.0 megahertz to about 4.0 megahertz to generate said converted luminance signal.

13. The method, as set forth in claim 10, wherein step (b) comprises the steps of:
    prefiltering said luminance signal to generate a prefiltered luminance signal; and
    selectively weighting said prefiltered luminance signal to generate said converted luminance signal.

14. The method, as set forth in claim 11, wherein step (b) comprises the step of:
    increasing logical values of said digital signal corresponding to said light gray signal portion.

15. The method, as set forth in claim 10, wherein step (c) comprises the steps of:

combining said converted luminance signal with a chrominance signal to produce a YUV signal; and converting said YUV signal to an RGB signal.

16. A system comprising:

a video processor being arranged to receive a luminance signal, said video processor comprising:
- a prefilter receiving said luminance signal and filtering said luminance signal to generate a prefiltered luminance signal;
- a bandpass filter receiving said prefiltered luminance signal and filtering said prefiltered luminance signal to generate a filtered luminance signal; and
- a weighting stage receiving said filtered luminance signal and weighting said filtered luminance signal to produce a weighted luminance signal;
- a graphics controller receiving said weighted luminance signal and creating a video image signal correlative to said weighted luminance signal; and
- a monitor receiving said video image signal and displaying a video image correlative thereto;
- wherein said luminance signal comprises frequency components from at least about 1.0 megahertz to as least about 4.25 megahertz and wherein said weighted luminance signal comprises frequency components more than ten decibels higher than said luminance signal from about 2.5 megahertz to about 4.25 megahertz.

17. The system, as set forth in claim 16, wherein said luminance signal comprises frequency components from at least about 1.0 megahertz to about 4.25 megahertz, and wherein said weighted luminance signal comprises frequency components at least twelve decibels higher than said luminance signal from about 3.0 megahertz to about 4.0 megahertz.

18. The system, as set forth in claim 16, wherein said weighting stage comprises a plurality of weighting levels.

19. The system, as set forth in claim 16, wherein said graphics controller combines said weighted luminance signal with a chrominance signal to produce a combined signal and creates said video image correlative to said combined signal.

20. A device for improving sharpness of a video image, said device comprising:

means for receiving a luminance signal, said luminance signal having frequency components from at least about 1.0 megahertz to at least about 4.25 megahertz;

means for boosting frequency components of said luminance signal by more than ten decibels from about 2.5 megahertz to about 4.25 megahertz to generate a boosted luminance signal; and means for generating a video image using said boosted luminance signal.

21. The device, as set forth in claim 20, wherein said boosting means comprises:

a prefilter receiving said luminance signal and filtering said luminance signal to generate a prefiltered luminance signal;

a bandpass filter receiving said prefiltered luminance signal and filtering said prefiltered luminance signal to generate a filtered luminance signal; and a weighting stage receiving said filtered luminance signal and weighting said filtered luminance signal to produce said boosted luminance signal.

22. The device, as set forth in claim 20, wherein said generating means comprises:

a graphics controller receiving said boosted luminance signal and creating a video image signal correlative to said boosted luminance signal; and a monitor receiving said video image signal and displaying a video image correlative thereto.

23. A device for enhancing a video image, said device comprising:

means for receiving a luminance signal, said luminance signal having a black signal portion, a white signal portion, and a transitional signal portion between said black signal portion and said white signal portion, said transitional signal portion having a dark gray signal portion and a light gray signal portion;

means for converting at least 50 percent of said light gray signal portion to said white signal portion to produce a converted luminance signal; and means for creating a video image using said converted luminance signal.

24. The device, as set forth in claim 23, wherein said converting means comprises:

a prefilter receiving said luminance signal and filtering said luminance signal to generate a prefiltered luminance signal;

a bandpass filter receiving said prefiltered luminance signal and filtering said prefiltered luminance signal to generate a filtered luminance signal; and a weighting stage receiving said filtered luminance signal and weighting said filtered luminance signal to produce said converted luminance signal.

25. The device, as set forth in claim 23, wherein said creating means comprises:

a graphics controller receiving said converted luminance signal and creating a video image signal correlative to said convertted luminance signal; and a monitor receiving said video image signal and displaying a video image correlative thereto.

26. A system comprising:

a video processor for receiving a luminance signal and boosting frequency components of said luminance signal by more than ten decibels from about 2.5 megahertz to about 4.25 megahertz to generate a boosted luminance signal; and a graphics controllers for generating a video image correlative to said boosted luminance signal.

27. A device for enhancing a video image, said device comprising:

a video processor receiving a luminance signal, said luminance signal having a black signal portion, a white signal portion, and a transitional signal portion, said video processor converting at least 50 percent of said transistional signal portion to said white signal portion to produce a converted luminance signal; and a graphics system creating a video image using said converted luminance signal.

28. The method of claim 1, step (b) comprising the steps of:

variably prefiltering said luminance signal under viewer control to generate a prefiltered luminance signal; and selectively weighting said prefiltered luminance signal under viewer control to generate said filtered luminance signal.

29. The method of claim 5, step (b) comprising the steps of:

variably prefiltering said luminance signal under viewer control; and selectively weighting said prefiltered luminance signal under viewer control to generate said boosted luminance signal.

30. The method of claim 10, wherein step (b) comprises the steps of:
- variably prefiltering said luminance signal under viewer control; and
- selectively weighting said prefiltered luminance signal under viewer control to generate said converted luminance signal.

31. The system of claim 16, wherein the prefilter and the weighting stage variably act under viewer control.

32. The device of claim 20, the boosting means variably acting under viewer control.

33. The device of claim 23, the converting means variably acting under user controls.

34. The system of claim 26, the video processor variably acting to boost frequency components of said luminance signal under viewer control.

35. The system of claim 27, the video processor converting a variable percentage of said transitional signal portion to said white signal portion under viewer control.

* * * * *